Feb. 5, 1957  B. BORISOF  2,780,151
METHOD AND APPARATUS FOR PHOTOGRAPHIC COMPOSING
Filed Feb. 7, 1952  6 Sheets-Sheet 1

INVENTOR.
Bernard Borisof
BY Zabel & Gritzbaugh
Attorney

INVENTOR.
Bernard Borisof
BY
Zabel & Gritzbaugh
Attorney

INVENTOR.
Bernard Borisof
BY Zabel & Gritzbaugh
Attorney

INVENTOR.
Bernard Borisof
BY Zabel & Gritzbaugh
Attorney

Feb. 5, 1957 B. BORISOF 2,780,151
METHOD AND APPARATUS FOR PHOTOGRAPHIC COMPOSING
Filed Feb. 7, 1952 6 Sheets-Sheet 6

Figure 1:
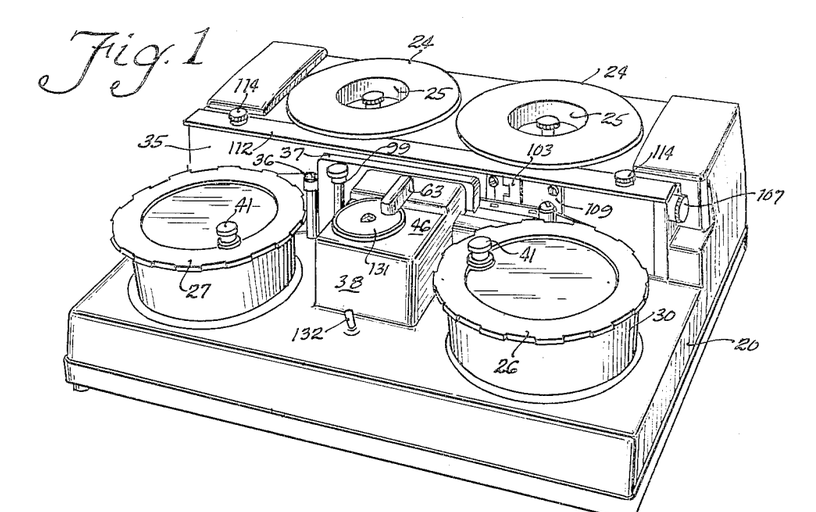
Fig. 1 is a perspective view of a preferred embodiment of my invention.
Figure 2:
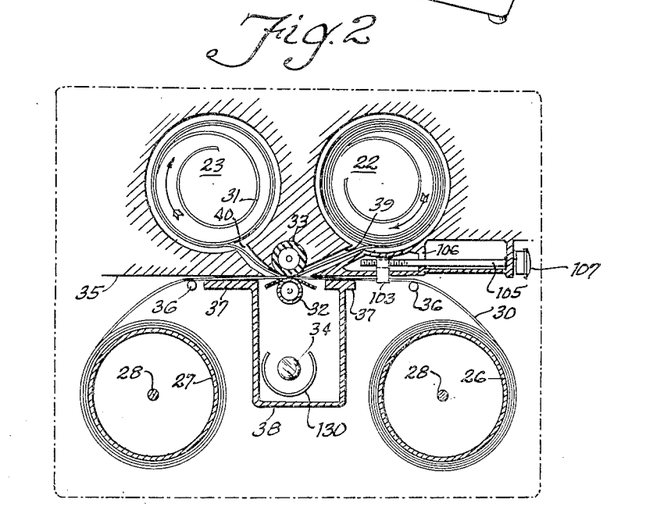
Figure 9:
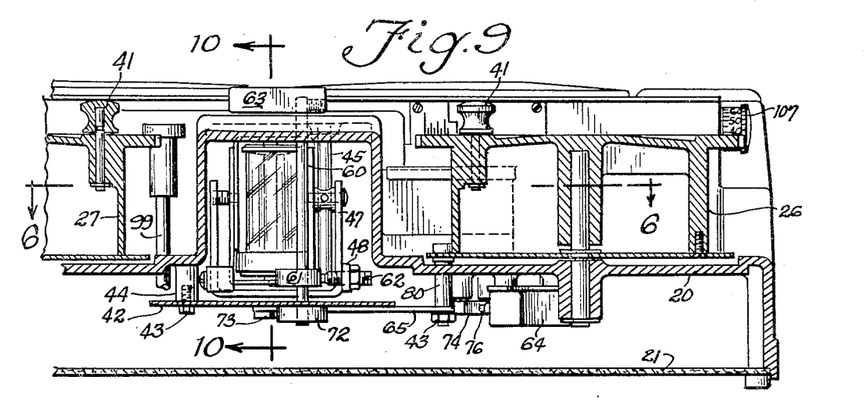
Fig. 9 is a vertical section taken along line 9—9 of Fig. 6.

INVENTOR.
Bernard Borisof
BY Zabel & Gritzbaugh
Attorney ing to a plan section, showing the general arrangement of the parts and indicating the general mode of operation;

With reference now to Figs. 1 and 2, the embodiment shown comprises a base 20 which is in the form of a hollow casting, and which may be provided with a bottom cover plate 21, as shown in Fig. 9. The rear portion of the base 20 is elevated with respect to the front portion, and the rear portion is formed so as to provide cylindrical compartments 22 or 23. These compartments are adapted to contain a strip 31 of sensitized paper on which the desired characters are to be photographically printed. The unexposed portion of the strip is contained in supply compartment 22 and the exposed portion is contained in compartment 23. Covers 24 are provided for the compartments, and it will be observed that the covers may desirably have depressed center portions so as to facilitate the disposition of the print strip 31 in coiled relationship, as shown in Fig. 2.

The front portion of the base supports two reels 26 and 27 upon which a film strip 30 is disposed or coiled. These reels are mounted on spindles 28 which project upwardly from the base 20.

Also suitably mounted on the base are a glass cylinder 32, a backing roller 33 and a light source 34, the latter being an incandescent electric lamp. In operation, the film strip 30 and the print strip 31 are caused to pass between the cylinder 32 and the roller 33 at a time when the light source is operative so that the characters on the

---

United States Patent Office 2,780,151
Patented Feb. 5, 1957

2,780,151

METHOD AND APPARATUS FOR PHOTOGRAPHIC COMPOSING

Bernard Borisof, Chicago, Ill., assignor of one-half to Allen Friedman, Chicago, Ill.

Application February 7, 1952, Serial No. 270,463

8 Claims. (Cl. 95—4.5)

This invention relates to an improved photographic composing device.

A device of this type is essentially a contact printing device which is arranged so as to permit letters or other characters to be printed in any selected order on a strip of sensitized paper. It is understood that subsequent to the printing operation, the strip of paper is developed in a manner well known to the art. One of the uses to which this device may be put is the printing of captions or headlines to be used in layout work.

It is an object of this invention to provide a composing device in which the letters are carried on a film strip. For instance, one or more complete type fonts may be carried on a single film strip. The operator of the device may have on hand a number of such film strips which represent a great variety of type fonts, any one of which can be used in the apparatus to be described.

It is a further object of this invention to provide an improved method and apparatus which permits regulation of spacing between different letters in an improved manner.

Another object is to provide a device of this sort in which the printing is effected by causing the film and print strips to be drawn in contact with each other past the light source, thereby causing exposure to take place while the strips are in motion, as contrasted with other contact printing devices in which the exposure takes place while the parts are stationary. The present arrangement permits much greater latitude in the size of the characters which may be printed. For instance, logotypes may be carried on the film strip and be readily reproduced.

Still another object is to provide in a photographic composing device, means for automatically extinguishing the light source after the desired exposure has taken place, thereby permitting shifting of the film with respect to the print strip in order to select the next letter to be printed.

Other objects are to provide a device of this type embodying readily removable or interchangeable film reels, to provide improved clamping mechanism for maintaining the film and the print in pressure engagement with each other, to provide a device which will accommodate film and print strips of substantial width to the end that two or three lines can be printed on a single print strip, and to provide a device having various novel features, such as: common control means for the light source and for the clamping mechanism, means for holding a ready supply of sensitized paper, light proof means for holding the print strip during the printing operation, means for cutting the finished strip from the roll, and a glass contact roller.

Other objects, features and advantages will become apparent as the description proceeds.

With reference to the drawings in which like reference numerals designate like parts:

Fig. 2 is a more or less diagrammatic view, correspondfilm strip will be photographically reproduced on the print strip.

The film passes in front of the vertical surface 35 provided by the stepped portion of the base, and its path is determined by guide posts 36 and a plate 37 which forms a part of a housing 38. The light source and the glass cylinder are disposed within the housing 38.

The base 20 is provided with suitable openings or slots so as to provide passageways 39 and 40 for the print strip, the passageway 39 leading from compartment 22 to the bite of the elements 32 and 33 and the passageway 40 extending between that bite and the compartment 23.

Knobs 41 are provided on reels 26 and 27 to facilitate the feeding of the film strip in either direction.

At certain times, the cylinder 32 is urged into pressure contact with the roller 33 so that the feeding of the film strip will cause simultaneous feeding of the print strip. At other times, the pressure engagement between the cylinder and the roller is released so that the film strip can be moved independently of the print strip. The means for mounting the cylinder 32 together with the means for establishing or releasing this pressure engagement will now be described.

Figure 6:
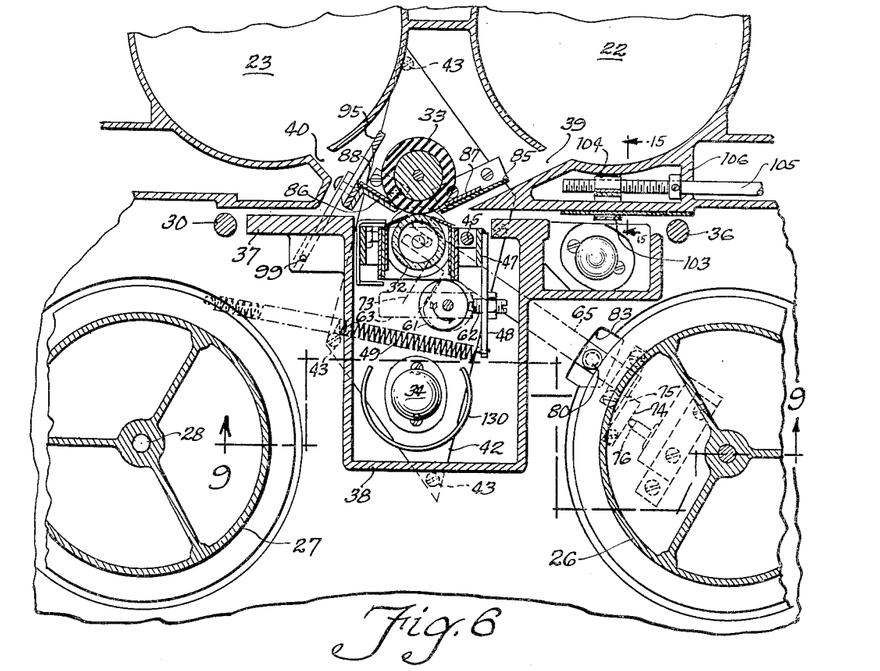
Fig. 6 is a plan section taken generally along line 6—6 of Fig. 9.
Figure 10:
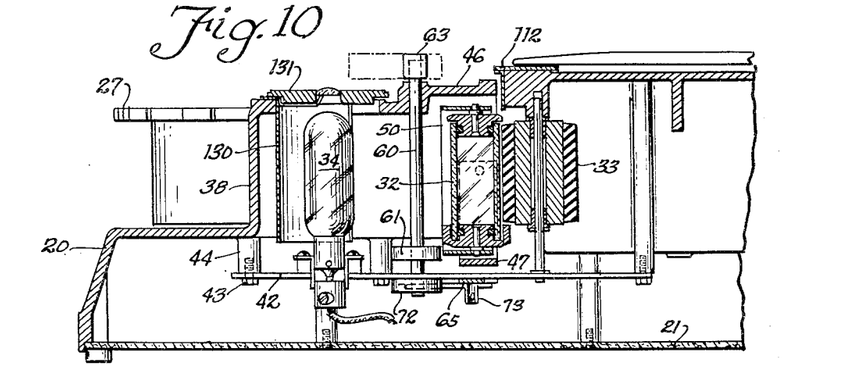
Fig. 10 is a vertical section taken along line 10—10 of Fig. 9.
Figure 12:
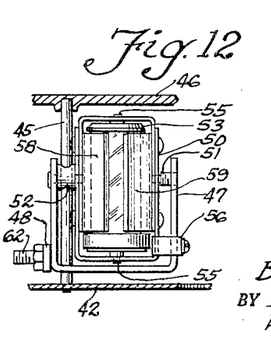
Fig. 12 is a rear elevation of the cylinder mounting means shown in Fig. 11.

A diamond shaped plate 42 is secured with respect to base 20 by means of screws 43 which take into suitable bosses 44 as shown in Figs. 6, 9 and 10. A pivot rod 45 is vertically mounted between the top surface 46 of the housing 38 and the plate 42, as shown in Fig. 12. A yoke 47, in the form of a U-shaped frame, as shown in Fig. 12, is pivotally mounted on a pivot rod 45 for rotation about a vertical axis. An arm 48 extends forwardly from the yoke 47, and a spring 49 which is tensioned between the arm 48 and a suitable lug on base 20 serves to bias the yoke in clockwise direction as shown in Fig. 7, thereby urging the cylinder 32 into pressure engagement with the roller 33.

The cylinder is cradled in the yoke in such a manner that full contact may be provided with the roll. As shown in Fig. 12, the cradling means includes a rectangular frame 50 which is mounted to swing about a horizontal axis by means of pivots 51 and 52, the pivots being secured to the yoke. The pivot 52 has an enlarged portion which receives the pivot rod 45 and serves as a trunnion for the movement of the assembly 47—50 about the pivot rod 45. The cylinder 32 includes top and bottom members 53 and 54 which carry stub shafts 55, the shafts being journaled in the frame 50 so that the glass cylinder can rotate as the film strip is advanced. Masking elements 58 are secured to the frame 50 and define a slot 59 which limits the printing area. Thus, as the two strips are fed past the roller, exposure occurs only opposite the slot 59.

By virtue of this universal mounting, the axes of rotating elements 32 and 33 are maintained in parallelism when the elements are in pressure contact.

Figure 7:
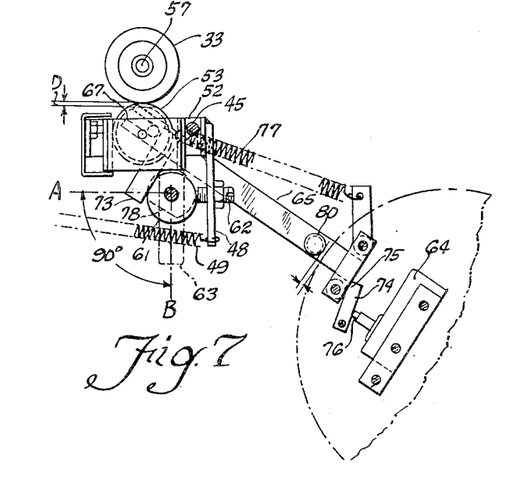
Fig. 7 is a plan view showing the cylinder mounting means and its relationship to the switch actuating mechanism.
Figure 11:
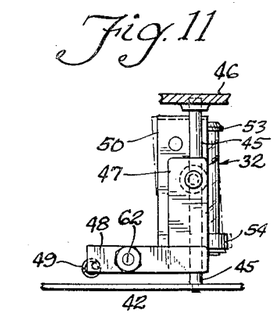
Fig. 11 is a side elevation of the cylinder mounting means.

The means for releasing the pressure contact is shown in Figs. 7 to 10. A shaft 60 is journaled in the top surface 46 and the plate 42 and carries a cam 61 in the form of an eccentric which engages a set screw 62 mounted on the arm 48. A control knob 63, which is disposed above the surface 46 provides means for rotating the cam, and hence regulates pressure contact between elements 32 and 33. As indicated diagrammatically in Figs. 7 and 8, the shaft assembly 60—63 can assume any one of three positions, A, B, or C. In the A position, which is shown in Fig. 6, the cam 61 will clear the set screw so that the full pressure of the spring 49 is applied to the cylinder mounting assembly 47—50 to provide the desired pressure contact which will cause the print strip to move with the film strip. When the knob and shaft is rotated into the B position, as shown in Fig. 7, the cylinder is retracted to provide a small clearance D which permits the film strip to be shifted independently of the print strip. As will be pointed out hereinafter, means are provided which exert a drag or snubbing effect on the print strip which cause it to remain stationary except when the parts are in pressure contact with each other. In the C position, shown in Fig. 8, the clearance E between the rotating elements is sufficiently great as to permit edgewise insertion of the strips between the rotating elements. In position B, the clearance is insufficient to permit edgewise displacement of the strips due to the presence of the flange provided by the top end member 53, as shown in Figs. 11 and 7. Thus, the control knob 63 regulates the pressure engagement between the cylinder 32 and the roller 33.

Figures 13, 14, 15, 16, 17, 19:
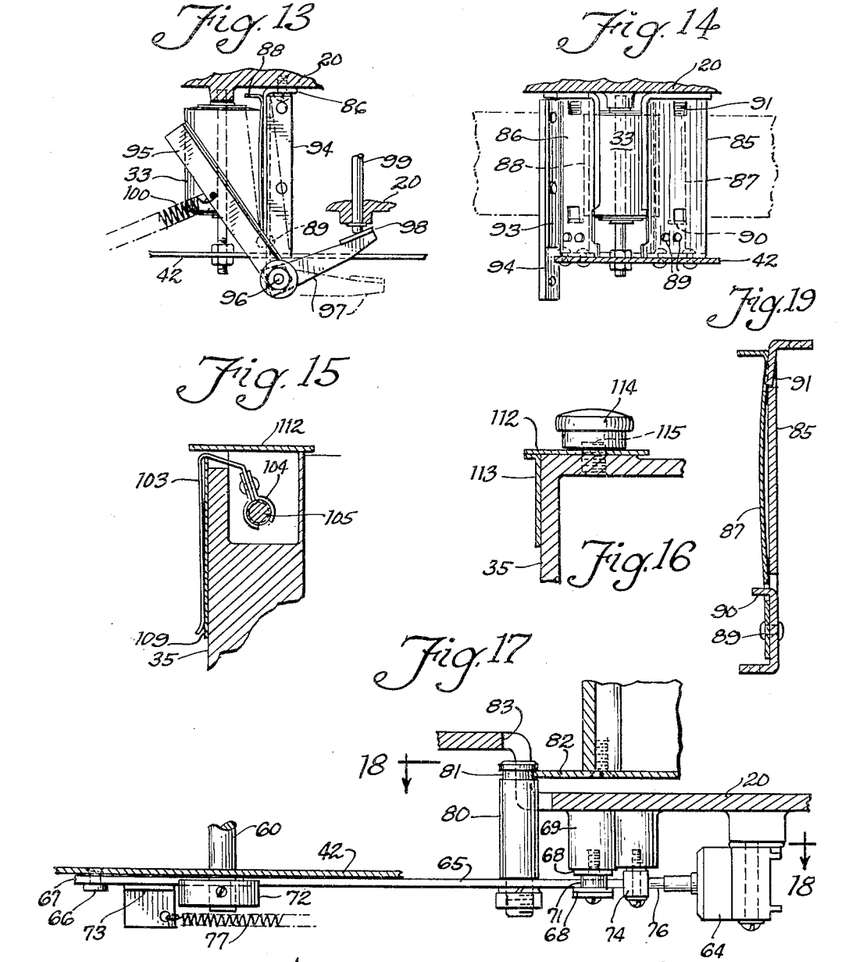
Fig. 13 is a view showing the shears in elevation.
Fig. 14 is a front elevation of the print guiding means.
Fig. 15 is a vertical section along line 15—15 of Fig. 6 showing the manner in which the slide is mounted.
Fig. 16 is a detailed vertical elevation showing the manner in which the flanged bar is secured to the base.
Fig. 17 is a vertical section showing in enlarged detail certain of the parts shown in Fig. 7.
Fig. 19 is an enlarged vertical section of the print guiding means shown in Fig. 14.

The control knob 63 also controls the condition of the light source 34. More specifically, the lamp, which constitutes a light source is in series circuit with a microswitch 64. As shown in Figs. 9 and 17, the microswitch is secured to the undersurface of the base 20 at a point beneath the reel 26. Means, including a lever 65, are provided for mechanically connecting the microswitch with the operation of the shaft 60.

The lever 65, which can be termed a toggle lever for reasons pointed out hereinafter, is disposed beneath the plate 42, and extends from the point beneath the cylinder 32 to a point adjacent the microswitch. Pivot means 66 projecting from the underside of plate 42, engage the forked end 67 of the toggle lever to support the same and to permit longitudinal movement thereof. The other end of the toggle lever is loosely received between and supported by two plates 68 which are carried on the underside of bosses 69 by means of screws 70, as shown in Fig. 17. Spacer 71 controls the spacing between the plates.

Figure 8:
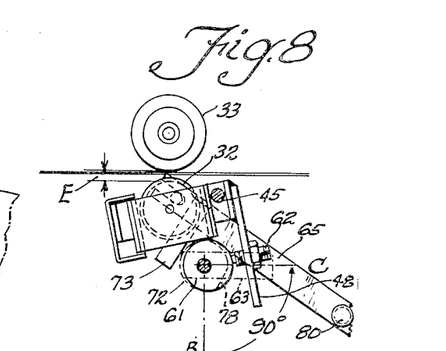
Fig. 8 is a view of Fig. 7 but showing the parts in a changed position.
Figure 18:
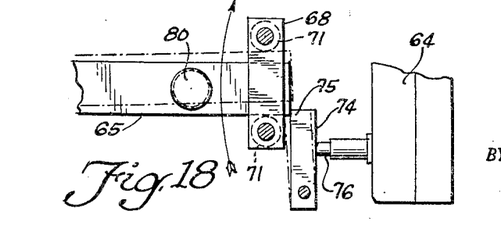
Fig. 18 is a plan view taken along line 18—18 of Fig. 17.

The shaft 60 extends beneath the plate 42 and carries at its lower end a cam 72 which cooperates with an arm 73 projecting from the toggle lever 65, as shown in Figs. 7, 8 and 17. Adjacent the other end of the toggle lever there is mounted a short lever 74, the corner 75 of which serves as a detent since it is adapted to be engaged by the end of the toggle lever. The short lever 74 engages the plunger 76 of microswitch 64. Thus, as the toggle lever is urged to the right, as shown in Figs. 7, 17 and 18, the plunger 76 will be depressed to close the lamp circuit. The plunger is normally biased outwardly into open circuit position. Thus, the microswitch is of the normally open circuit type, depression of the plunger serving to turn on the lamp 34.

A spring 77 is connected at one end to the toggle lever 65 and at the other end, it is suitably anchored to the structure of the machine. This spring is stronger than the bias of the plunger 76; hence, it urges the arm 73 against the cam 72, and urges the short lever 74 and the plunger 76 into closed circuit position when the position of cam 72 permits.

The cam 72 is provided with a flat portion 78 which is opposite the arm 73 when the control knob 63 is in the A position. Thus, when the film and print strips are clamped between the elements 32 and 33, the lamp is on, and the control lever is in position A. When the control lever is moved to position B or C to release the clamping pressure, the lamp is turned off. Thus, when the film strip is shifted with respect to the print strip in order to select a new letter in preparation for the next printing operation, the lamp is off.

As will be indicated in greater detail hereinafter, the spacing between the characters on the film strip is greater than the intended spacing of the characters on the print strip. Thus, after a given character has been printed by causing the film and the print to move completely past the aperture while the light source is on, the intended operation of the machine contemplates that both the film and the print be moved back to a position that is determined by the spacing desired between the letters on the print strip. In this latter position of the film and the print, the letter just printed will be exposed in the aperture. Therefore, means are provided for automatically extinguishing the light source as the film and strip are moved back to this second position even though the control knob is in its A position, and the elements 32 and 33 are in clamped position.

The operation of this automatic means is controlled by the reverse movement of the film reel 26, with which the toggle lever 65 cooperates. An upstanding pillar 80 (Fig. 17) is provided on the toggle lever which is formed at its upper end with a groove 81 adapted to engage the flange 82 of film reel 26. The base 20 is cut away at this point as indicated by the reference numeral 83.

The movement of the film strip from reel 26 to reel 27 can be referred to as the forward movement or feed of the film, and movement in the opposite diection can be termed the reverse movement. When the control lever is in A position, the spring 77 urges the pillar 80 against the flange 82. During forward movement of the film, the rotation of the reel and flange urges the toggle lever in the clockwise direction, as shown in Figs. 7 and 18. When, however, the rotation of reel 26 is reversed, as indicated by the arrow in Fig. 18, the pillar and toggle lever will be displaced rearwardly so as to cause the toggle lever to slip off of the detent 75, thereby releasing the short lever 74 and the plunger 76 to permit the lamp circuit to open. When the motion of reel 26 ceases, the part will remain in open circuit position, since the detent 75 blocks the return of the toggle lever.

The bottom of the groove 81 can preferably be formed of some material having a high coefficient of friction so as to insure positive action. It will be seen that the action of the toggle lever and the reel is essentially a toggle action which causes release of the detent when the rotation of the reel is reversed. As indicated above, this reversal takes place at the conclusion of each printing operation and prior to the release of the clamping pressure. The mechanism is automatically cocked by rotation of the control lever into the B position, which releases the clamping pressure, and then by rotating the control lever back into the A position after a new letter has been selected.

Means are provided to impose a drag on the paper strip so that its position will not be affected by the shifting of the film strip when the clamping pressure has been released. Such means includes guide plates 85 and 86 having bent-over top and bottom portions by means of which they may be secured to the underside of base 20 and to the top surface of the plate 42, as shown in Figs. 13 and 14. These guide plates are located in passageways 39 and 40, respectively, as shown in Fig. 6. Leaf springs 87 and 88 are secured to and overlie the rear surface of the guide plates. The print strip passes between the guide plates and the leaf springs, the latter serving to impose the necessary drag. Rivets 89 secure the leaf springs to the guide plates as shown in Fig. 14. Fig. 19 shows the cooperation of guide plate 85 and leaf spring 87 in detail; the parts 86 and 88 are similar thereto. The guide plate 85 is provided with a struck out portion 90 forming a lug on which the lower edge of the print strip rides. Toward its upper portion, the guide plate is also provided with an extrusion 91 which prevents the print strip from moving upwardly out of registry with the film strip. The leaf spring 87 is provided with suitable openings to accommodate these guide portions 90 and 91. It will be seen that the upper end of the leaf springs may be displaced rearwardly to permit the insertion of the print strip.

Means are provided to cut off the print strip after a portion thereof has been exposed, so that portion can be removed from the compartment 23 and developed. As shown in Fig. 13, such means comprise a fixedly mounted shear blade 94 and a movable blade 95. The blade 94 is fixed to a bent-over end portion 93 formed on guide plate 86. A movable blade 95 is secured to the fixed blade 94 by a suitable pivot 96 at the bottom of the fixed blade. An arm 97 is secured to the movable blade and has an end portion 98 which is engaged by a plunger 99. Thus, depression of the plunger, which extends through the base 20 and is accessible to the operator, will cut off the print strip. A suitable spring 100 biases the blade 95 into open position.

Figure 3:
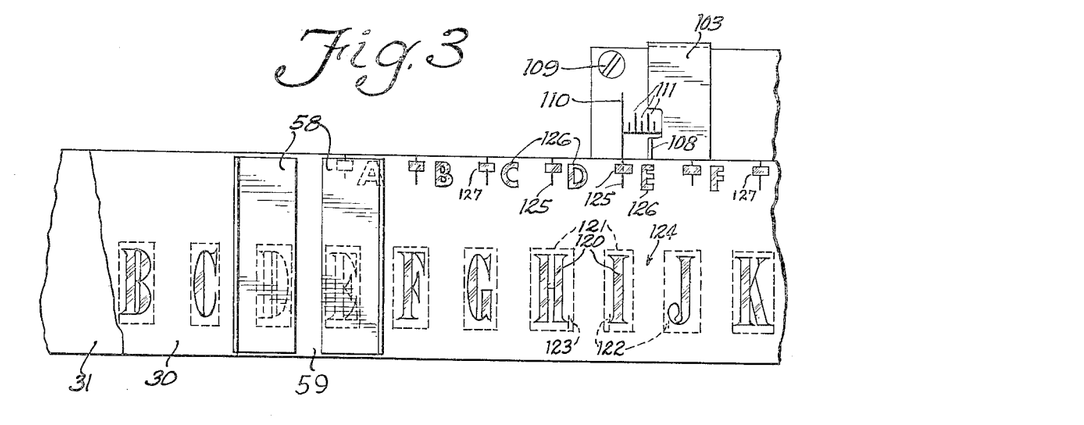
Fig. 3 is an elevation of the film strip and print strip showing their relationship to each other and to certain parts of the machine prior to the printing of the letter "E"

To facilitate the positioning of the strips 30 and 31 at the conclusion of each printing operation, a slide 103 is provided which is provided with an internally threaded follower 104, shown in Fig. 15. The latter cooperates with a threaded shaft 105 which is rotatably journaled in web portions 106 of the base, as shown in Fig. 6. A calibrated knob 107 is affixed to the shaft at its outer end, as shown in Fig. 1, so that the position of the slide may be regulated by the operator. The slide carries an index point 108 which, as shown in Fig. 3, is in the form of a line. The slide overlies a plate 109 which is suitably secured to the vertical surface 35. The plate is also provided with a fixed index point 110 and an adjustable index point 108 is provided, both of which are readily visible to the operator. The plate 109 also carries calibrations 111 to facilitate the positioning of the slide with respect to the plate.

The recess in which the shaft 105 is located, and the passageways 39 and 40 are covered by a cover bar 112 shown in Figs. 1 and 16. The cover bar is provided with a light proofing flange 113 and is removably mounted on the base by means of a knob 114 and screw 115. It will be observed that the forward edge of the cover bar overhangs the passageway between the plate 37 and the vertical surface 35 so as to prevent room light from entering to fog the paper. It will be observed that the covers 24 provide light-proof closures for the compartments 22 and 23. The cover bar is easily removed so as to permit threading of the print strip.

The film strip 30, as shown in Fig. 3, is provided with a plurality of characters 120. For purposes of illustration, a rectangle 121 has been drawn around certain of the characters, this rectangle indicating what might be referred to as the type body, as distinguished from the type face which is coextensive with the outline of the character 120. The spaces 122 and 123 respectively, can be referred to as the left and right type shoulders. The width of the type shoulders is such that when two type bodies are placed in abutting relationship, there will be a certain spacing between the type faces which can be referred to as the normal spacing. The normal spacing is composed of the sum of the right shoulder 123 of one letter and the left shoulder 122 of the immediately following letter. The width of the type shoulders can vary from one character to another, and in some instances, such as in the letter J, one shoulder will be narrower than the other.

It will be observed that the type bodies 121 of the different characters are spaced from each other by what may be referred to as the operating space 124.

Figure 4:
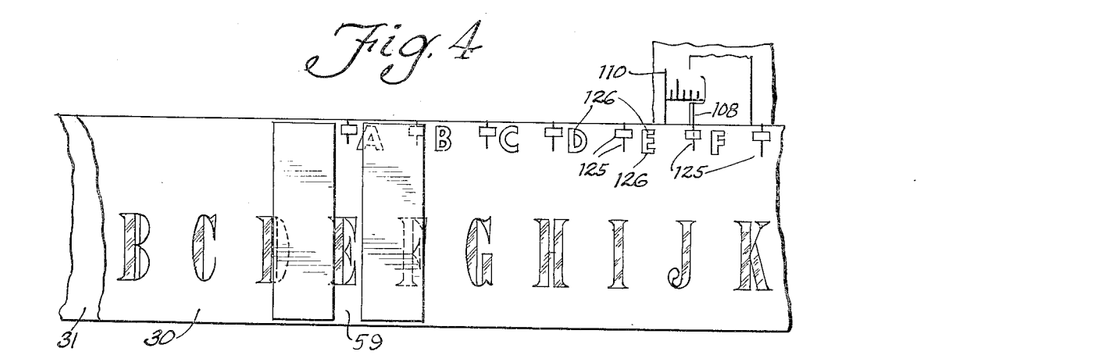
Fig. 4 is a view similar to Fig. 3, but showing the extent of reverse movement of the film and the print after the printing of the letter "E"
Figure 5:
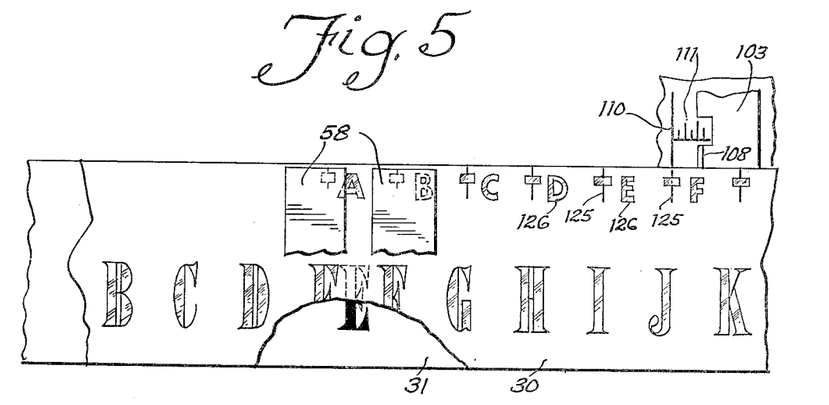
Fig. 5 is a view similar to Fig. 4, but showing the relative shift between the film and the print preparatory to the printing of the letter "F"

The intended operation of the present invention is illustrated by a comparison of Figs. 3, 4 and 5. In the film, the type face 120 is transparent; the remainder of the film is opaque. The operating space, for the purpose of illustration, can be considered as being equal to the width of the slot 59. In actual practice, the width of the operating space and of the slot may not be equal; the operating space may be of substantially greater width than the slot width. The operating space, being opaque, permits a character to start from the right of the slot and pass completely across the slot for exposure without bringing into exposure either adjacent character on the film. Similarly, when the operating space is disposed opposite the slot, there will be no exposure of the print. It will be observed that the upper edge of the film strip carries index marks 125, and an index letter 126 is placed adjacent each index mark. As shown in Fig. 3, when the index mark 125 for the letter "E" registers with the fixed index point 110, the operating space between "D" and "E" is positioned so that the left hand margin of the operating space coincides with the left hand margin of the slot.

To print the letter "E," the control knob is swung into its "A" position, and reel 27 is rotated so as to move the film toward the left. Since the elements 32 and 33 are in pressure contact with each other, the print strip will also be moved, thereby exposing the print strip and printing the letter "E" thereon. The motion of the parts is continued until the type face 120 of the letter "E" has passed completely beyond the left-hand margin of the slot. This is indicated by the approach of the succeeding index mark 125 to the index point 110. Then the motion of the two strips is reversed so as to bring the letter "E" back into the slot 59. However, the reversal of the strips causes lamp 34 to be extinguished. The extent of reverse movement desired is indicated by the position of the index point 108, the slide having been adjusted so that the distance between the index points 108 and 110 is identical to the width of the operating space. This position of the parts is shown in Fig. 4. The pressure between rotating elements 32 and 33 is then released, and a new letter is selected in this case, letter F. Fig. 5 shows diagrammatically the relationship of the film strip and the print strip at the beginning of the subsequent printing operation. It will be seen that the print strip has remained stationary during the shifting of the film strip with the result that the printed letter E is much closer to the film letter F than is the film letter E. Thus, the reverse movement has the effect of eliminating the operating spaces from the print strip.

Thus, when normal spacing is desired, the slide 103 is set so that the distance between the fixed and movable index points corresponds to the width of the operating spaces. The operating spaces for a particular font of type are all identical, and this distance is indicated on each particular film.

Where other than normal spacing is desired, the setting of the slide is somewhat different. For instance, if an additional 0.1 inch spacing is desired, the spacing knob 107 is rotated so as to decrease the spacing between the index points 108 and 110 by 0.1 inch. Similarly, if decreased spacing is desired between the letters, the slide is shifted to the right by a corresponding amount. Thus, it is possible to justify a line of type, provided that the increase or decrease in spacing is first determined either by calculation or by reference to a table or by making a trial run.

Figure 23:
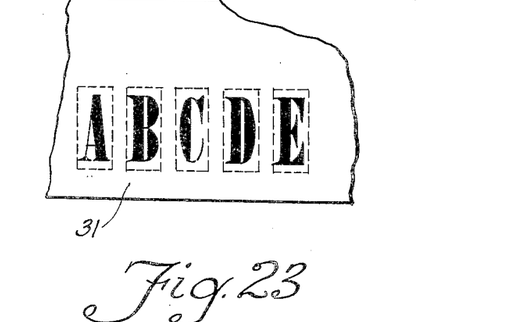
Fig. 23 shows the film strip and illustrates the increased spacing that can be provided.

The foregoing is illustrated in Fig. 23 which shows the increased spacing that may be provided between the printed letters on the print strip 21. If normal spacing were to be desired, the rectangles shown in Fig. 23 would be contiguous to each other.

It is desirable to overlap some letters of a word printed on the print strip in order to achieve more artistic composition. For example, the left side of the letter "T" in the word "colt" extends over the right type shoulder of the letter "L." This overlapping is known in the printing trade as "kerning."

Figure 20:
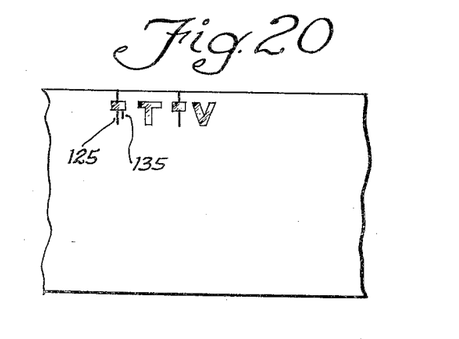
Fig. 20 is a view of the film strip showing the kern mark.

The present invention provides means for kerning. As shown in Fig. 20, an extra index mark 135 is provided immediately to the right of the index mark 125 for the letter "T." This index mark can be referred to as the kern mark. The spacing between the kern mark 135 and the index mark 125 represents the extent of overlapping. When it is desired to kern the letter "T" after the letter "L" or a similarly shaped letter, instead of aligning the index mark 125 with the index point 110 at the beginning of the printing cycle, the kern mark 135 is aligned therewith. Thus, the "T" will be reproduced on the print strip in the desired overlapping relationship. Kern marks may also be provided for other letters where desired, such as "Y" and "V" and "A."

It is contemplated, when smaller sized type is used, that the film strip carry two or more lines of identical type. Thus, by masking out, in a three line film strip, the bottom two lines, the first line can be printed. Then a mask is substituted that masks out the first and third lines while the second line is printed; then a mask is substituted which masks out the first and second lines while the third line is printed. By this method, a multi-line caption may be printed on one strip.

Figure 21:
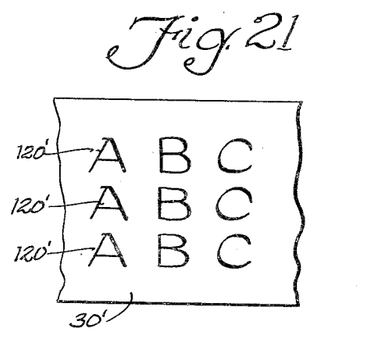
Fig. 21 shows a modified film strip adapted for multi-line printing.
Figure 22:
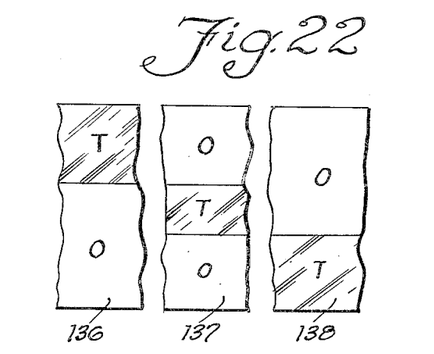
Fig. 22 illustrates a form of mask to be used in multi-line printing.

This multi-line printing is illustrated in Figs. 21 and 22, in which the reference numeral 30' designates a film strip having identical characters 120' reproduced in three rows. A series of masks 136, 137 and 138 is provided. The masks may each be in the form of a short length or loop of film strip having a transparent portion "T" and opaque portions "O," the transparent portion "T" in mask 136 exposing the first line, that in 137 exposing the second line and that in 138 exposing the third line, the remaining lines in each instance being blocked out. One or the other of these masking strips may be inserted between the film strip 30' and the glass cylinder 32. If the masking strip is in the form of a loop which surrounds the cylinder 32 or the cylinder 32 and the housing 38, the operation is somewhat facilitated. However, other types of mask may be utilized for this purpose without departing from the spirit of the invention, in order to print a multi-line caption on a single strip.

Transparent windows 127 are provided in the film strip which intersect the index marks 125. The latter are in the form of vertical lines which may photographically be printed on the film at the same time that the characters are printed thereon. Since it is oftentimes difficult to print a uniform line of intensity all the way out to the edge of the film, the provision of the windows 127 facilitates the alignment of the index marks 125 with the index points 108 and 110.

As shown in Figs. 2 and 6, a combination light shield and reflector 130 is disposed around the lamp 34. The light shield may be rotated or turned so as to cut down on the amount of light, and reduce the exposure, when desired. The housing 38 is provided with a removable cover 131 which permits adjustment of the light shield and replacement of the lamp. A suitable off and on switch 132 is provided which disconnects the lamp circuit from the power source.

To summarize the principle of operation, the provision of the opaque operating spaces 124 permits the letters to be printed one at a time. The printing of a given letter on the print strip is effected by feeding both strips past the light source while maintaining their superposed relationship. The provision of the index marks on the film and the two index points on the machine permit the reverse movement of both strips into a position in which the print strip will receive the next letter to be printed in the desired spaced relationship. In other words, this reverse movement serves to subtract the distance represented by the operating space 124.

The elements 32 and 33, or either of them, can be modified so as to provide for sliding contact rather than rolling contact, if desired.

It will be seen that I have provided a photographic composing device embodying the following features and improvements:

(1) A glass contact roller;

(2) An improved spacing mechanism and method of letter spacing, justification, and kerning;

(3) An improved mechanism for clamping the film and print strips to each other;

(4) An improved switch mechanism actuated by reverse movement of the film strip;

(5) The use of film in the form of a strip running parallel with the photographic paper or print strip;

(6) The use of two reels for carrying the film;

(7) An improved method of multiline printing and paragraph composing; and (8) A method of composing in which the index marks are laterally displaced from the characters of the film.

Although only a preferred embodiment of this invention has been shown and described herein, it will be apparent that various modifications and changes may be made in the construction and method described herein without departing from the spirit of the invention as pointed out by the appended claims.

I claim:

1. A photographic composing machine comprising a light source, means for feeding a film strip and a print strip in a forward direction past said light source in superposed relationship, means for urging said strips into pressure engagement with each other so as to maintain the relative superposed positions of said strips during said feeding operation, means for releasing said pressure engagement so that said film strip may be moved independently of said print strip, and means responsive to a reversal of the feeding movement of said strips for extinguishing said light source, said feeding means including a film reel, and said light extinguishing means including a toggle lever having a portion engaging said film reel and cooperating therewith to provide a toggle action when said reel is rotated.

2. A photographic composing machine comprising a glass cylinder and a backing roller between which superposed film and print strips may be passed, a light source, said glass cylinder being disposed between said light source and said backing roller whereby photographic contact between a film and a strip will be made at the line of contact between said cylinder and backing roller, masking means disposed between said cylinder and said backing roller and at either side of said line of contact for providing a slot-like aperture whereby the area of printing will be confined to said line of contact and to a relatively small area on either side thereof, a light-proof compartment disposed adjacent said cylinder and backing roller and at one side thereof so as to accommodate a supply of unexposed print strip, a pair of film reels disposed on opposite sides of said cylinder and backing roller means for rotating said reel so that said film strip may be fed from one reel to the other and vice-versa, means urging said cylinder and said backing roller into pressure engagement with each other so that said print strip will be caused to move with said film strip, by rotation of said reels, and a base member, said light proof compartment comprising a cylindrical recess formed in the upper surface of said base member, and a removable cover for said cylindrical recess and cooperating therewith in light-proof relationship, said removable cover being provided with a depressed centrally disposed cylindrical portion providing an annular guide to facilitate the arrangement of said print strip within said compartment in coiled relationship.

3. A photographic composing machine comprising a glass cylinder and a backing roller between which superposed film and print strips may be passed, a light source, said glass cylinder being disposed between said light source and said backing roller, a light-proof compartment disposed adjacent said cylinder and backing roller and at one side thereof so as to accommodate a supply of unexposed print strip, a pair of film reels disposed on opposite sides of said cylinder and backing roller so that said film strip may be fed from one reel to the other and vice-versa, means urging said cylinder and said backing roller into pressure engagement with each other so that said print strip will be caused to move with said film strip, said light source including a lamp and lamp circuit therefor, a switch in said lamp circuit, means for releasing said pressure contact to permit independent movement of said film strip with respect to said print strip, means providing a mechanical connection between said releasing means and said switch so that said light source will be extinguished when said releasing means is actuated, one of said reels being provided with a flange, and said means for providing mechanical connection comprising a lever, pivot means for said lever, said lever being mounted for longitudinal displacement with respect to said pivot means and said lever including a portion engaging said reel flange, means for biasing said lever so that said portion is urged against said reel flange, and stop means for limiting the pivoted motion of said lever in one direction whereby movement of said reel in one direction urges said lever against said stop means, and movement of said reel in the opposite direction will move said lever away from said stop means for actuating said switch so that reversing the movement of said reel will automatically extinguish said light source.

4. In a photographic composing machine having a light source, and a slot-like aperture providing an exposure area of predetermined width, the combination of an opaque film strip having a series of transparent characters formed thereon, said characters being separated from each other by a distance equal the sum of the widths of adjacent type shoulders and a constant operating space, a fixed index point on said machine and an index mark on said film adapted to register therewith to indicate the disposition of a particular character to the right of the right-hand edge of said aperture, and a second index point on said machine spaced to the right of said first index point by a distance equal to the width of said operating space and cooperating with an index mark to indicate the disposition of said character to the left of said right-hand edge of said aperture whereby a print strip movable with said film strip may be positioned so that the normal spacing between adjacent characters printed thereon will be equal to the sum of the widths of adjacent type shoulders.

5. A composing machine as claimed in claim 4 in which said second index point is adjustably mounted so that the spacing between adjacent characters printed on said film strip can be increased or decreased with respect to said normal spacing.

6. In a photographic composing machine including a light source, and means providing an exposure area of predetermined width, the combination of an opaque film strip having a series of transparent characters formed thereon, said characters being separated from each other by a distance equal to the sum of the widths of adjacent type shoulders and a constant operating space, said distance being greater than the width of said exposure area, a fixed index point on said machine and an index mark on said film adapted to register therewith to indicate the disposition of a particular character to the right of said exposure area so that an opaque operating space will be disposed opposite said exposure area, and a second index point on said machine and cooperating with an index mark to indicate the disposition of said character opposite said exposure area whereby a print strip movable with said film strip may be positioned so that the normal spacing between adjacent characters printed thereon will be equal to the sum of the widths of adjacent type shoulders.

7. A film strip for a photographic composing machine of the type described herein comprising an opaque film strip having a series of transparent characters formed thereon, said characters being separated from each other by a distance equal to the sum of the widths of the adjacent type shoulders of two adjacent characters plus the width of a constant operating space, and a series of index marks provided on said film, one for each of the aforesaid characters, each of said index marks indicating the line of division between the left-hand type shoulder of its associated character and the operating space to the left thereof, said index marks constituting a line of substantial length and said film strip being provided with a series of apertures which intersect said lines so that said lines extend on both sides thereof.

8. A film strip for a photographic composing machine of the type described herein comprising an opaque film strip having a series of transparent characters formed thereon, said characters being separated from each other by a distance equal to the sum of the widths of the adjacent type shoulders of two adjacent characters plus the width of a constant operating space, and a series of index marks provided on said film, one for each of the aforesaid characters, said index marks indicating the lines of division between the left-hand type shoulder of their associated characters and the operating space to the left thereof, all of said index marks being laterally offset from said division lines by a uniform distance, and certain of said index marks being provided with kern marks which are spaced therefrom by a distance corresponding to the amount of kerning desired for the letter associated with the particular index mark.

References Cited in the file of this patent

UNITED STATES PATENTS

| | | |
|---|---|---|
| 910,832 | Lukacsevics | Jan. 26, 1909 |
| 943,614 | Blacklidge | Dec. 14, 1909 |
| 1,237,239 | Bunnell | Aug. 14, 1917 |
| 1,259,355 | Bunnell | Mar. 12, 1918 |
| 1,283,394 | Bawtree | Oct. 29, 1918 |
| 1,553,920 | Smothers | Sept. 15, 1925 |
| 1,798,109 | Rankin | Mar. 24, 1931 |
| 1,805,333 | Hunter | May 12, 1931 |
| 1,808,123 | Uher | June 2, 1931 |
| 1,968,287 | Farina | July 31, 1934 |
| 1,980,287 | Ogden | Nov. 13, 1934 |
| 2,049,944 | Carpenter | Aug. 4, 1936 |
| 2,095,849 | Wittel | Oct. 12, 1937 |
| 2,160,750 | Meyer | May 30, 1939 |
| 2,298,574 | Lockhart | Oct. 13, 1942 |
| 2,364,188 | Bryce | Dec. 5, 1944 |
| 2,372,910 | Pratt | Apr. 3, 1945 |
| 2,435,099 | Pratt | Jan. 27, 1948 |
| 2,492,005 | Pratt | Dec. 20, 1949 |
| 2,616,344 | Patience | Nov. 4, 1952 |